US011012597B2

(12) United States Patent
Fujimoto et al.

(10) Patent No.: US 11,012,597 B2
(45) Date of Patent: May 18, 2021

(54) VIBRATING DEVICE AND OPTICAL DETECTOR DEVICE

(71) Applicant: Murata Manufacturing Co., Ltd., Nagaokakyo (JP)

(72) Inventors: Katsumi Fujimoto, Nagaokakyo (JP); Hitoshi Sakaguchi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/817,679

(22) Filed: Mar. 13, 2020

(65) Prior Publication Data

US 2020/0213495 A1    Jul. 2, 2020

Related U.S. Application Data

(63) Continuation of application No. PCT/JP2018/022986, filed on Jun. 15, 2018.

(30) Foreign Application Priority Data

Dec. 27, 2017    (JP) .............................. JP2017-250770

(51) Int. Cl.
*H04N 5/225* (2006.01)
*B06B 1/02* (2006.01)
(Continued)

(52) U.S. Cl.
CPC ....... *H04N 5/22521* (2018.08); *B06B 1/0207* (2013.01); *B06B 1/0651* (2013.01);
(Continued)

(58) Field of Classification Search
CPC ............. H04N 5/22521; H04N 5/2253; H04N 5/2171; H04N 5/2251; H04N 5/2252;
(Continued)

(56) References Cited

U.S. PATENT DOCUMENTS

| 2010/0060760 A1* | 3/2010 | Sakurai ................ H04N 5/2254 348/294 |
| 2011/0005030 A1* | 1/2011 | Shirono ............... H04N 5/2253 15/363 |

(Continued)

FOREIGN PATENT DOCUMENTS

| WO | 2017/022382 A1 | 2/2017 |
| WO | 2017/110564 A1 | 6/2017 |

OTHER PUBLICATIONS

Official Communication issued in International Patent Application No. PCT/JP2018/022986, dated Sep. 18, 2018.

*Primary Examiner* — Albert H Cutler
(74) *Attorney, Agent, or Firm* — Keating & Bennett, LLP

(57) ABSTRACT

A vibrating device includes a dome-shaped cover, a cylindrical or substantially cylindrical vibrating body, and a piezoelectric element. The dome-shaped cover is disposed so as to include a detection field of an optical detector element, and the cylindrical or substantially cylindrical vibrating body is fixed to the cover. The piezoelectric element is fixed to the vibrating body and vibrates the cover via the vibrating body. The vibrating body includes a cylinder portion, a first connection portion connected to a first end portion of the cylinder portion, a first ring-shaped portion connected to the first connection portion at a position near the cover, a second connection portion connected to a second end portion of the cylinder portion, and a second ring-shaped portion connected to the second connection portion at a position opposite to a surface to which the cylinder portion is connected.

19 Claims, 14 Drawing Sheets

(51) Int. Cl.
*B06B 1/06* (2006.01)
*G02B 27/00* (2006.01)
*B08B 7/02* (2006.01)
*G03B 17/02* (2021.01)
*G03B 17/08* (2021.01)
*G03B 17/56* (2021.01)

(52) U.S. Cl.
CPC ............ *B08B 7/02* (2013.01); *G02B 27/0006* (2013.01); *B06B 2201/77* (2013.01)

(58) Field of Classification Search
CPC .. H04N 5/2254; B06B 1/0207; B06B 1/0651; B06B 2201/77; G02B 27/0006; G02B 13/001; B08B 7/02; G03B 17/02; G03B 17/08; G03B 17/56; G08B 13/19617; G08B 13/19619; G08B 13/19626
USPC .................................................. 348/373, 374
See application file for complete search history.

(56) References Cited

U.S. PATENT DOCUMENTS

| | | | |
|---|---|---|---|
| 2012/0050860 A1* | 3/2012 | Sakatani | H04N 5/2171 359/507 |
| 2012/0243093 A1* | 9/2012 | Tonar | G03B 17/08 359/507 |
| 2014/0036084 A1* | 2/2014 | Lu | G02B 26/005 348/148 |
| 2016/0266379 A1* | 9/2016 | Li | H04N 5/2171 |
| 2017/0371154 A1* | 12/2017 | Fedigan | G03B 17/08 |
| 2018/0095272 A1 | 4/2018 | Fujimoto et al. | |
| 2018/0154406 A1* | 6/2018 | Magee | G02B 27/0006 |
| 2018/0210194 A1 | 7/2018 | Nishiyama et al. | |
| 2018/0221921 A1* | 8/2018 | Magee | B08B 7/028 |

* cited by examiner

FIG. 11

|     | n=0 | n=1 | n=2 |
|-----|-----|-----|-----|
| m=0 | + | +\|− | +\|− / −\|+ |
| m=1 | −/+ | +\|− | −\|+/−\|+ ... |
| m=2 | (concentric +) | (concentric +\|−) | (concentric quadrants) |

VIBRATING DEVICE AND OPTICAL DETECTOR DEVICE

CROSS REFERENCE TO RELATED APPLICATIONS

This application claims the benefit of priority to Japanese Patent Application No. 2017-250770 filed on Dec. 27, 2017 and is a Continuation Application of PCT Application No. PCT/JP2018/022986 filed on Jun. 15, 2018. The entire contents of each application are hereby incorporated herein by reference.

BACKGROUND OF THE INVENTION

1. Field of the Invention

The present invention relates to a vibrating device for removing foreign matter, such as water droplets or dust, remaining on a dome-shaped cover and to an optical detector device that includes the vibrating device.

2. Description of the Related Art

There have been proposed various types of camera modules in which a light-transmissive member is disposed in front of an imaging element of camera. WO2017/110564 describes a water-droplet removing device in such a camera module. WO2017/110564 further discloses a vibrating device having a structure in which a cylinder-shaped body is connected to a dome-shaped light-transmissive member. The dome-shaped light-transmissive member is configured to be vibrated in a (m, n) mode. Here, "m" denotes the number of nodal lines present in the radial direction of the circular light-transmissive member and "n" denotes the number of nodal lines present in the circumferential direction thereof. WO2017/110564 describes a (0, 0) mode, a (1, 0) mode, a (0, 1) mode, and a (1, 1) mode.

Water droplets remaining on the surface of the light-transmissive member are removed by vibrating the dome-shaped light-transmissive member in such modes.

The vibrating device described in WO2017/110564, however, does not readily and adequately move liquid droplets remaining on the dome-shaped light-transmissive member or takes time to atomize liquid droplets.

SUMMARY OF THE INVENTION

Preferred embodiments of the present invention provide vibrating devices that are each able to move or atomize liquid droplets using larger amplitude vibrations, and optical detector devices that each include a vibrating device according to a preferred embodiment of the present invention.

A vibrating device according to a preferred embodiment of the present invention includes a dome-shaped cover disposed so as to include a detection field of an optical detector element, a cylindrical or substantially cylindrical vibrating body to which the cover is fixed, and a piezoelectric element that is fixed to the vibrating body and vibrates the cover via the vibrating body. The vibrating body includes a cylinder portion including a first end portion positioned near the cover and a second end portion positioned opposite to the cover, a cylindrical or substantially cylindrical first connection portion that is connected to the first end portion of the cylinder portion and has an inside diameter larger than that of the cylinder portion, and a first ring-shaped portion that is connected to the first connection portion at a position near the cover and has an inside diameter smaller than that of the first connection portion. The cover is connected to a surface of the first ring-shaped portion that is proximate to the cover. The vibrating body also includes a second connection portion that is connected to the second end portion of the cylinder portion and has an outside diameter smaller than that of the cylinder portion, and a second ring-shaped portion that is fixed to a surface of the second connection portion that is opposite to a surface to which the cylinder portion is connected and that has an outside diameter larger than that of the second connection portion. In the vibrating body, the piezoelectric element is fixed to a surface of the second ring-shaped portion that is opposite to the surface fixed to the second connection portion.

Preferred embodiments of the present invention provide vibrating devices that are each able to vibrate a dome-shaped cover with a larger amplitude and thus move and atomize liquid droplets more efficiently.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a diagram for explanation of an (m, n) mode.

DETAILED DESCRIPTION OF THE PREFERRED EMBODIMENTS

The present invention will be clarified by describing preferred embodiments of the present invention with reference to the drawings.

Figure 1:
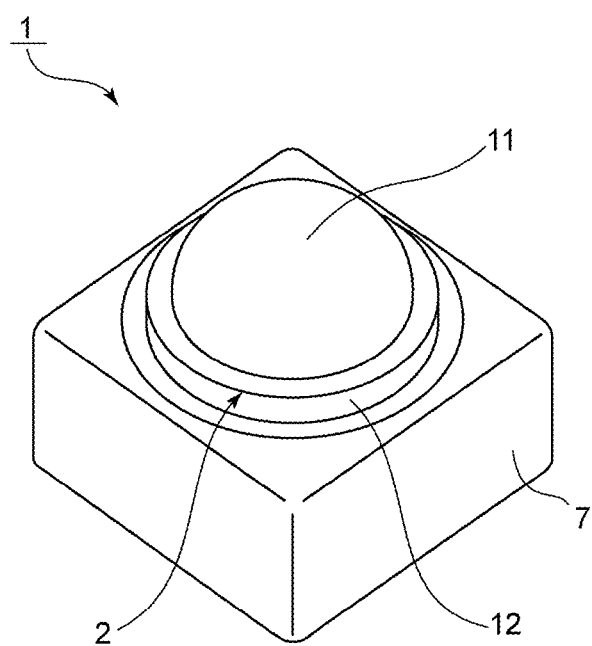
FIG. 1 is a perspective view illustrating an external appearance of a camera according to a first preferred embodiment of the present invention.
Figure 2:
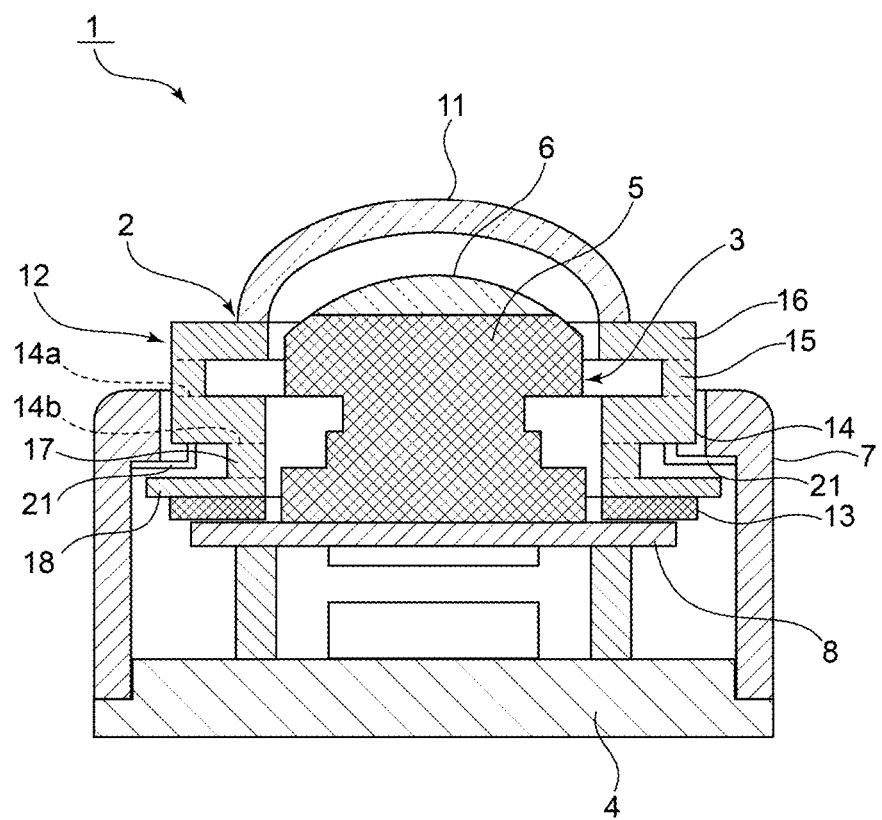
FIG. 2 is an elevation cross-sectional view illustrating the camera according to the first preferred embodiment of the present invention.

FIG. 1 is a perspective view illustrating an external appearance of a camera according to a first preferred embodiment of the present invention, and FIG. 2 is an elevation cross-sectional view illustrating the camera according to the first preferred embodiment.

A camera 1 includes a vibrating device 2 that defines and functions as a water-droplet removing device and a camera body 3. The camera body 3 is fixed to a base plate 4. An imaging unit 5 is disposed at the top end of the camera body 3. The imaging unit 5 includes therein a circuit including an imaging element. A lens module 6 is fixed at the top end of the imaging unit 5. A cylindrical or substantially cylindrical casing member 7 is disposed on the base plate 4. A portion of the vibrating device 2 is disposed inside the casing member 7.

The vibrating device 2 includes a dome-shaped cover 11. The dome-shaped cover 11 is a light-transmissive member preferably made of, for example, glass or plastic. The dome-shaped cover 11 may be configured such that only a portion of the dome-shaped cover 11 positioned within the camera's field of view is defined by a light-transmissive member.

In the vibrating device 2, a cylindrical or substantially cylindrical vibrating body 12 is fixed to the dome-shaped cover 11. A piezoelectric element 13 is fixed to the bottom end of the cylindrical or substantially cylindrical vibrating body 12. Actuating the piezoelectric element 13 vibrates the entire vibrating portion including the piezoelectric element 13, the vibrating body 12, and the cover 11.

A first connection portion 15 and a second connection portion 17 also have cylindrical or substantially cylindrical shapes. In addition, a first ring-shaped portion 16 and a second ring-shaped portion 18 are preferably defined by annularly shaped plates. The "annularly shaped plate" refers to a plate having a radial dimension larger than the thickness. However, the first and second ring-shaped portions 16 and 18 are not limited to such annularly shaped plates.

The vibrating body 12 includes a cylinder portion 14, the first connection portion 15, the first ring-shaped portion 16, the second connection portion 17, and the second ring-shaped portion 18. In the present preferred embodiment, as illustrated in FIG. 2, the cylinder portion 14, the first connection portion 15, the first ring-shaped portion 16, the second connection portion 17, and the second ring-shaped portion 18 are integrally provided so as to have respective coaxial central axes. In FIG. 2, boundary surfaces between these elements are indicated by dotted lines. This structure, however, may be provided by joining separate members together.

The cylinder portion 14 includes a first end portion 14a positioned near the cover 11 and a second end portion 14b positioned opposite to the cover 11. The first connection portion 15 is connected to the first end portion 14a. The first ring-shaped portion 16 is connected to the first connection portion 15 at a position near the cover 11. The cover 11 is fixed to a surface of the first ring-shaped portion 16 positioned near the cover 11. The second connection portion 17 is connected to the second end portion 14b. The second ring-shaped portion 18 is fixed to a surface of the second connection portion 17 that is opposite to the surface to which the cylinder portion 14 is connected.

The inside diameter of the first connection portion 15 is larger than that of the cylinder portion 14. The outside diameter of the first connection portion 15 is the same or substantially the same as that of the cylinder portion 14. The inside diameter of the first ring-shaped portion 16 is smaller than that of the first connection portion 15. The outside diameter of the first ring-shaped portion 16 is the same or substantially the same as the outside diameter of the cylinder portion 14. In other words, the first connection portion 15 is disposed between the first ring-shaped portion 16 and the cylinder portion 14 at a position near the outer circumferential surfaces thereof. Accordingly, the first ring-shaped portion 16 protrudes inward in the radial direction from an end portion of the first connection portion 15 near the cover 11. The first ring-shaped portion 16 is a vibrating plate that has a ring shape.

In addition, the inside diameter of the second connection portion 17 having a cylindrical or substantially cylindrical shape is the same or substantially the same as that of the cylinder portion 14. The outside diameter of the second connection portion 17 is smaller than that of the cylinder portion 14.

The second connection portion 17 is disposed such that the inner circumferential surface thereof is flush with that of the cylinder portion 14.

The outside diameter of the second ring-shaped portion 18 is larger than that of the second connection portion 17. The inside diameter of the second ring-shaped portion 18 is the same or substantially the same as that of the second connection portion 17. The second ring-shaped portion 18 is disposed such that the inner circumferential surface thereof is flush with that of the second connection portion 17. In other words, the second connection portion 17 is disposed between the cylinder portion 14 and the second ring-shaped portion 18 at a position near the inner circumferential surfaces thereof and is disposed further inward relative to the first connection portion 15. Accordingly, in the vibrating device 2, the cylindrical or substantially cylindrical vibrating body 12 has an S shaped cross section as illustrated in FIG. 2, which is the cross-sectional view taken in the radial direction.

Note that the outside diameter of the second ring-shaped portion 18 is larger than the outside diameter of the cylinder portion 14. In the present preferred embodiment, the second ring-shaped portion 18 is a ring-shaped vibrating plate. More specifically, the second ring-shaped portion 18 is a flange that protrudes radially outward from the outer circumferential edge of the second connection portion 17.

The piezoelectric element 13 has a ring shape. In the vibrating device 2, the ring-shaped piezoelectric element 13 is actuated so as to vibrate in the up-down direction. This causes the cylindrical or substantially cylindrical vibrating body 12 and the cover 11, which are fixed to the ring-shaped piezoelectric element, to vibrate.

Figure 3:
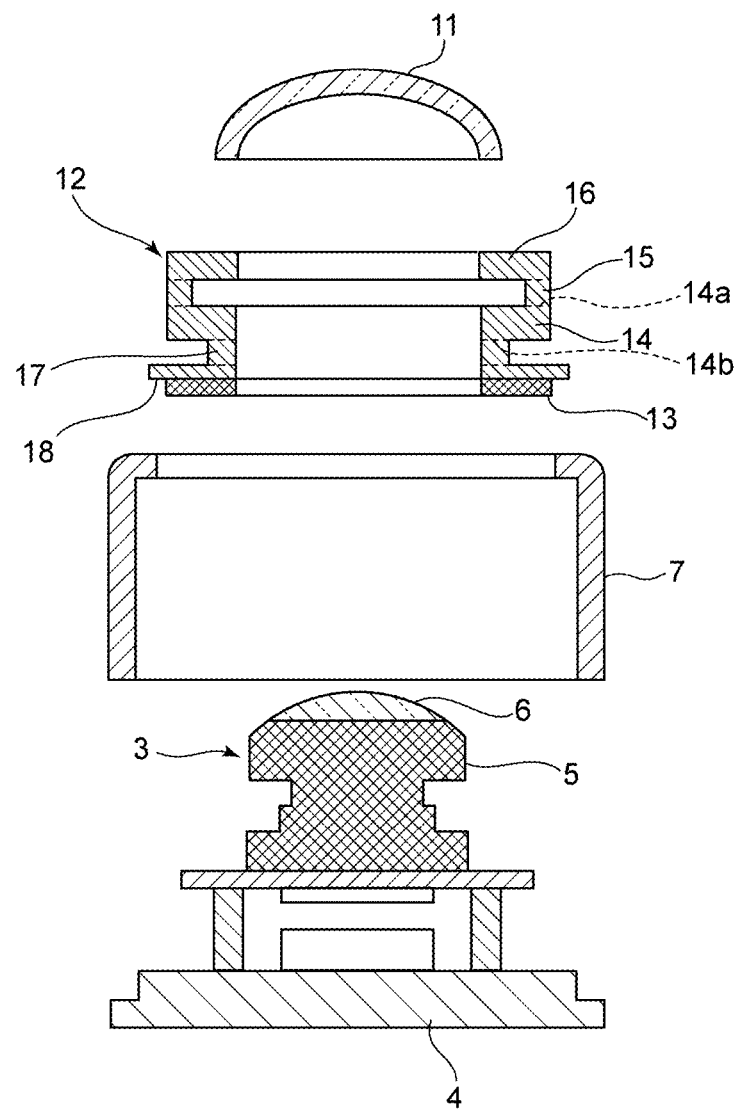
FIG. 3 is an exploded elevation cross-sectional view illustrating the camera according to the first preferred embodiment of the present invention.

FIG. 3 is an exploded elevation cross-sectional view illustrating the camera 1 for explaining the structure thereof.

Figure 4:
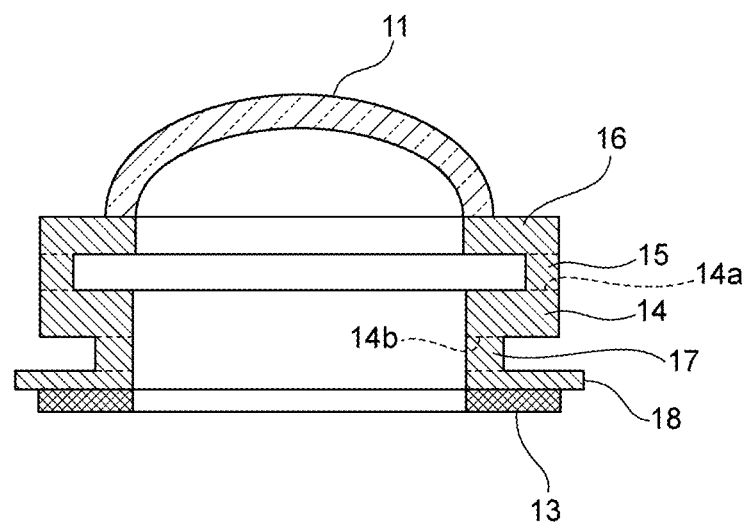
FIG. 4 is an elevation cross-sectional view illustrating a structure in a vibrating device according to the first preferred embodiment of the present invention, in which a dome-shaped cover, a cylindrical or substantially cylindrical vibrating body, and a piezoelectric element are joined.

FIG. 4 is an elevation cross-sectional view illustrating a structure in which the cylindrical or substantially cylindrical vibrating body 12, the piezoelectric element 13, and the cover 11 are joined to each other.

Figure 5:
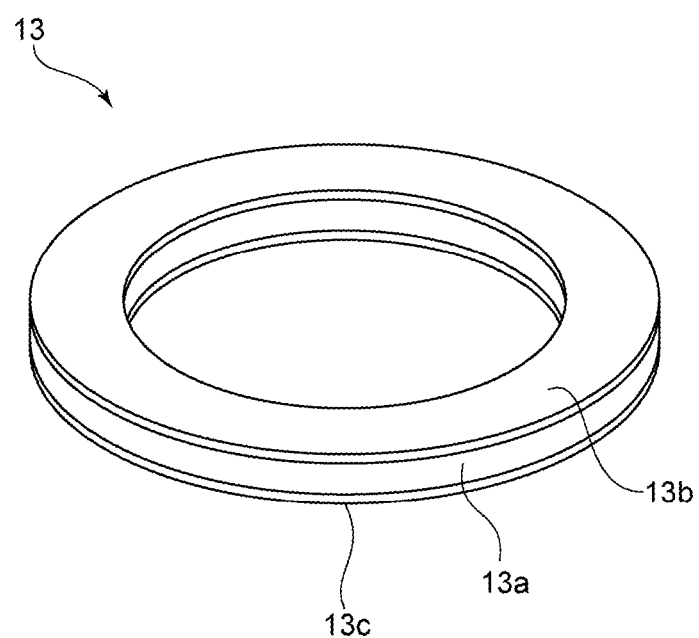
FIG. 5 is a perspective view of a piezoelectric element to be used in the first preferred embodiment of the present invention.

FIG. 5 is a perspective view illustrating the piezoelectric element 13. The piezoelectric element 13 includes a ring-shaped piezoelectric body 13a and electrodes 13b and 13c, and the electrodes 13b and 13c are fixed to respective principal surfaces of the piezoelectric body 13a. Here, the ring-shaped piezoelectric body 13a has an annular shape. However, the ring-shaped piezoelectric body 13a may have a ring shape other than the annular shape. Moreover, the piezoelectric body 13a need not have a ring shape. The piezoelectric element may include multiple rectangular or substantially rectangular plate-shaped piezoelectric bodies arranged in the circumferential direction of the piezoelectric element. The piezoelectric body 13a includes multiple regions that are arranged in the circumferential direction and in which respective polarization directions are different from one another in the thickness direction, which will be described later with reference to FIGS. 10A to 10C. The piezoelectric body 13a vibrates so as to oscillate in the up-down direction when an alternating electric field is applied between the electrodes 13b and 13c.

Figure 6:
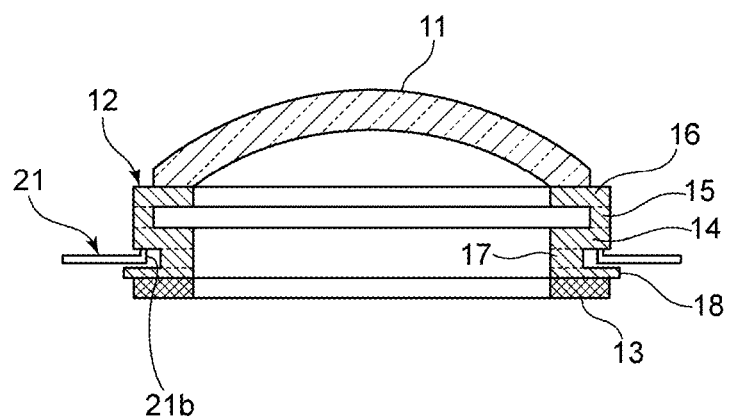
FIG. 6 is an elevation cross-sectional view of a first example of a support structure of the vibrating device according to the first preferred embodiment of the present invention.
Figure 7:
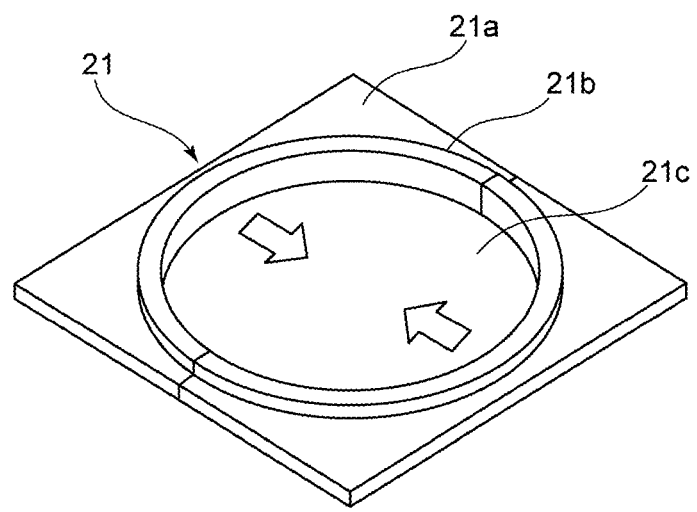
FIG. 7 is a perspective view of a support member used in the support structure illustrated in FIG. 6.

FIG. 6 is an elevation cross-sectional view illustrating a first example of a support structure that supports the structure of FIG. 4 from outside. A support plate 21 illustrated in FIG. 7 is used here. The support plate 21 includes a plate body 21a and a cylindrical or substantially cylindrical support wall 21b that surrounds a circular opening 21c provided in the plate body 21a. The support wall 21b is integral with the plate body 21a. The bottom surface of the cylinder portion 14 is disposed on the top surface of the support wall 21b, thus supporting the vibrating body 12.

Figure 8:
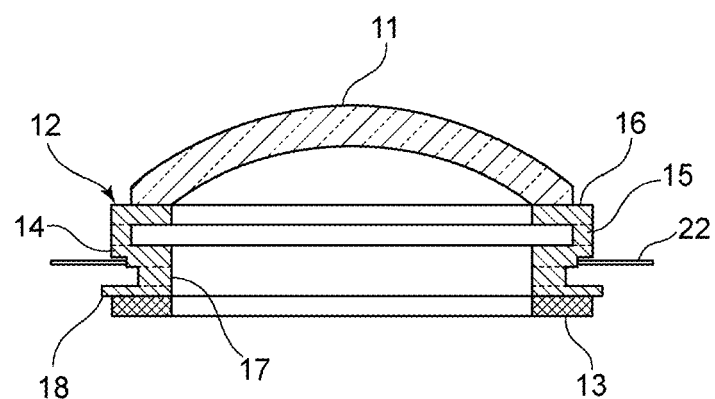
FIG. 8 is an elevation cross-sectional view of a second example of a support structure for a vibrating body disposed in the vibrating device according to the first preferred embodiment of the present invention.
Figure 9:
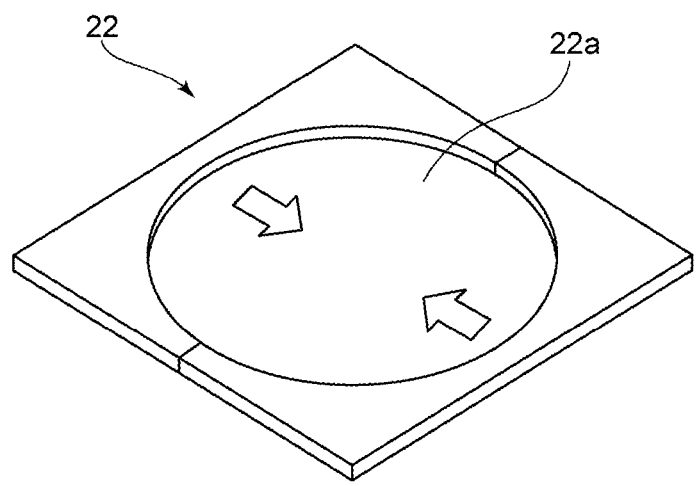
FIG. 9 is perspective view illustrating a support member used in the support structure illustrated in FIG. 8.

FIG. 8 is an elevation cross-sectional view of a second example of the structure that supports the vibrating body 12 from outside. FIG. 9 is perspective view illustrating a support member used in the support structure illustrated in FIG. 8. A support member 22 has a rectangular or substantially rectangular plate shape including a circular opening 22a at the center thereof. As illustrated in FIG. 8, the inner circumferential surface of the support member 22 is in contact with the side surface of the cylinder portion 14. The support member 22 thus supports the vibrating body 12.

Note that the structure to support the vibrating body 12 is not limited to the first and second examples described above.

Figure 10A:
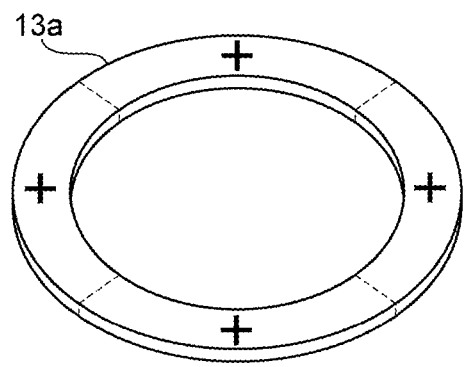
FIGS. 10A to 10C are perspective views of an example of a polarization configuration of a ring-shaped piezoelectric element in a piezoelectric vibrator.
Figure 10B:
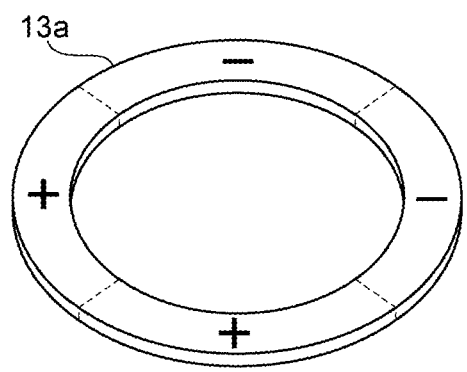
Figure 10C:
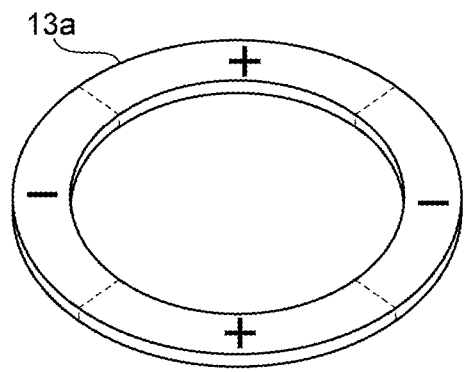

FIGS. 10A to 10C are perspective views of an example of the polarization configuration in the piezoelectric element. In FIGS. 10A to 10C, only the piezoelectric body 13a of FIG. 5 is illustrated, in which polarization directions of respective regions are depicted.

In FIGS. 10A to 10C, the regions marked by "+" refer to regions in which the polarization axis extends in the thickness direction of the piezoelectric body 13a from the bottom surface thereof to the top surface. On the other hand, the regions marked by "−" refer to regions in which the polarization axis extends in the thickness direction of the piezoelectric body 13a from the top surface thereof to the bottom surface.

In FIG. 10A, all of the polarization directions of the regions arranged in the circumferential direction are oriented in the same direction.

In FIG. 10B, on the other hand, in four regions separated along the circumference of the piezoelectric body, opposing regions straddling the center have opposite polarization directions.

In FIG. 10C, in four regions separated along the circumference of the piezoelectric body, opposing regions straddling the center have the same polarization directions.

When the piezoelectric body 13a illustrated in FIG. 10A is used, vibrations of the (0, 0) mode, which will be described later, are generated in the dome-shaped cover 11 by actuating the ring-shaped piezoelectric element and causing the vibrating device 2 to vibrate. On the other hand, when the polarization configuration of the piezoelectric body 13a illustrated in FIG. 10B is used, vibrations of the (0, 1) mode are generated in the dome-shaped cover 11.

When the polarization configuration of the piezoelectric body 13a illustrated in FIG. 10C is used, vibrations of the (0, 2) mode are generated in the dome-shaped cover 11.

In the present preferred embodiment, the vibrating device 2 uses the (0, 0) mode, the (0, 1) mode, and the (0, 2) mode, which will be described later in detail. Note that as described previously, in the term "(m, n) mode", "m" denotes the number of nodal lines present in the radial direction and "n" denotes the number of nodal lines present in the circumferential direction, in which "m" and "n" are integers.

The (m, n) mode is depicted schematically in FIG. 11. Here, phases of vibration in regions of the cover 11 are illustrated when the cover 11 is viewed in plan. In FIG. 11, the region marked with "+" and the region marked with "−" vibrate in opposite phases.

Among such (m, n) modes, the vibrating device according to the present invention uses the (0, 0) mode, the (0, 1) mode, and the (0, 2) mode.

Figure 12A:
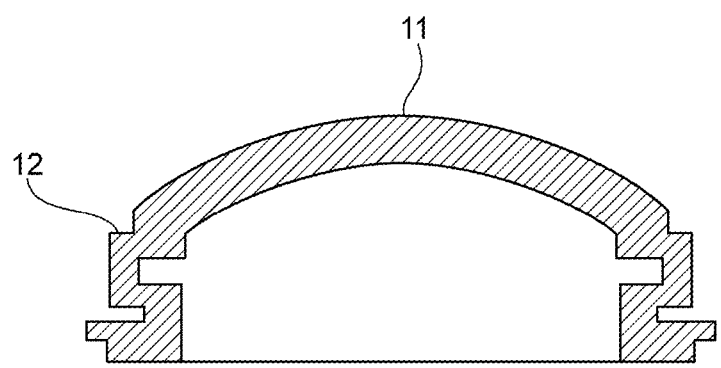
FIG. 12A is a schematic elevation cross-sectional view of a state of the vibrating device of the first preferred embodiment of the present invention not being displaced.
Figure 12B:
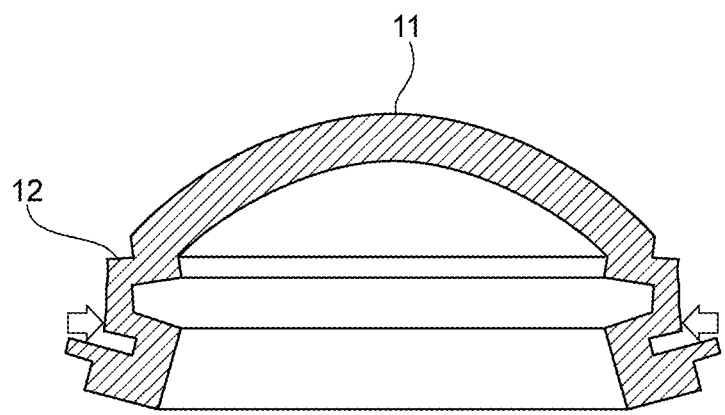
FIG. 12B is a schematic elevation cross-sectional view of the shape and the nodes of vibration in a state of the vibrating device being maximally displaced in a (0, 0) mode.

FIG. 12A is a schematic elevation cross-sectional view of a state of the vibrating device of the first preferred embodiment not being displaced, and FIG. 12B is a schematic elevation cross-sectional view of the shape and the nodes of vibration in a state of the vibrating device being maximally displaced in the (0, 0) mode. In FIG. 12B, arrows indicate positions of vibration nodes.

As illustrated in FIG. 12B, the dome-shaped cover 11 is displaced to its maximum at the center thereof in the (0, 0) mode. This enables a liquid present in a central region of the cover 11 to move a large amount. This makes it easier to atomize the liquid present in the central region.

Figure 13:
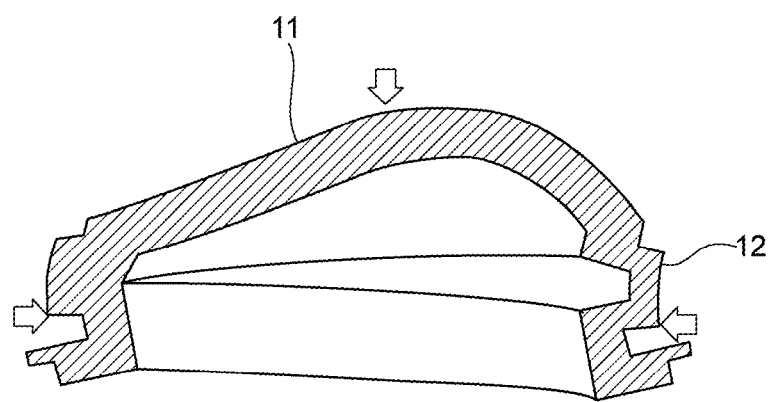
FIG. 13 is a schematic elevation cross-sectional view of the shape and the node positions of vibration when the vibrating device of the first preferred embodiment of the present invention vibrates in a (0, 1) mode and exhibits a maximum displacement.
Figure 14:
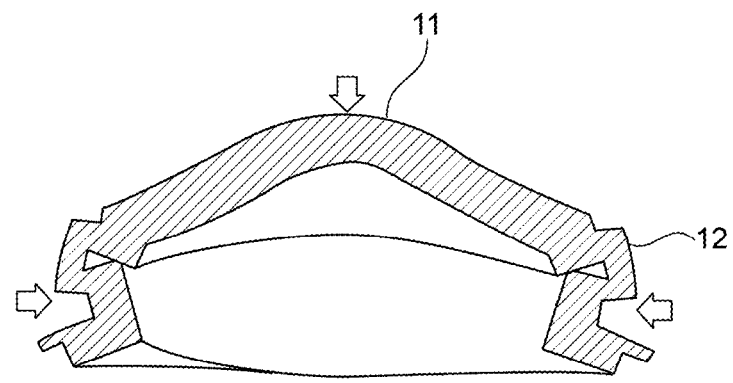
FIG. 14 is a schematic elevation cross-sectional view the shape and the node positions of vibration when the vibrating device of the first preferred embodiment of the present invention vibrates in a (0, 2) mode and exhibits a maximum displacement.

FIG. 13 is a schematic elevation cross-sectional view illustrating the shape and the node positions of vibration in a state of the vibrating device being maximally displaced in the (0, 1) mode of vibration. The positions of vibration nodes are also indicated by arrows. In the (0, 1) mode, one side region and the other side region of the cover 11 with respect to the center thereof are displaced a large amount in an alternating manner. Accordingly, with the (0, 1) mode, liquid droplets remaining on the outside surface of the dome-shaped cover 11 can be dispersedly moved to areas on the cover 11 other than the center and can be atomized. A small amount of liquid droplets remaining in the working region is atomized at the center by changing the vibration mode, which enables liquid droplets to be removed without increasing the amplitude of vibration. FIG. 14 is a schematic elevation cross-sectional view illustrating the shape and the node positions of vibration in a state of the vibrating device being maximally displaced in the (0, 2) mode of vibration. In the (0, 2) mode illustrated in FIG. 14, as is the case for the (0, 1) mode, liquid droplets can be dispersedly moved when liquid droplets are located at positions other than the center of the cover 11 and near vibrating points. Consequently, a small amount of liquid droplets remaining on nodes is atomized at the center, which enables liquid droplets to be removed without increasing the amplitude of vibration.

Note that vibration nodes are not generated in the cover 11 in the (0, 0) mode. This does not disturb the field of view. No nodal line extends in the circumferential direction in the cover 11 in any of the (0, 0) mode, the (0, 1) mode, and the (0, 2) mode. This is because the vibrating body 12 has a structure in which the cross section taken in the radial direction has an S shape. Due to the vibrating body 12 having such a structure, nodal lines extending in the circumferential direction as occurring in a (1, 0) mode, a (1, 1) mode, or a (1, 2) mode are relocated to a middle portion of the vibrating body 12 in the thickness direction thereof. If the vibrating body 12 was a one-piece ring-shaped vibrating body, a nodal line extending in the circumferential direction would be present within the cover. In the present preferred embodiment, however, the vibrating body has the S-shaped radial cross section, which enables nodal lines, except for radially extending nodal lines, to be positioned out of the field of view.

In the present preferred embodiment, the cylinder portion 14 is preferably disposed such that the second end portion 14b thereof is positioned within a range of about ½±40% of a dimension of the cylindrical or substantially cylindrical vibrating body 12 in a direction extending between the first end portion 14a of the cylinder portion 14 and the second end portion 14b thereof (in other words, in a direction parallel or substantially parallel to the central axis of the cylinder portion 14). As a result, the cylindrical or substantially cylindrical vibrating body 12 of the vibrating device 2 can be supported by the support structure illustrated in FIG. 6 or the support structure illustrated in FIG. 8 without hindering vibration of the vibrating body 12.

The inventors of preferred embodiments of the present invention have discovered that when the outside diameter of the second ring-shaped portion 18 is denoted by "J" and the outside diameter of the cylinder portion 14 is denoted by "D" in the vibrating device 2, the cover 11 can be vibrated largely if a J-dimension ratio, which is expressed as (J−D)/D, falls within a specific range. The following explains this point with reference to FIGS. 15 to 18.

Figure 15:
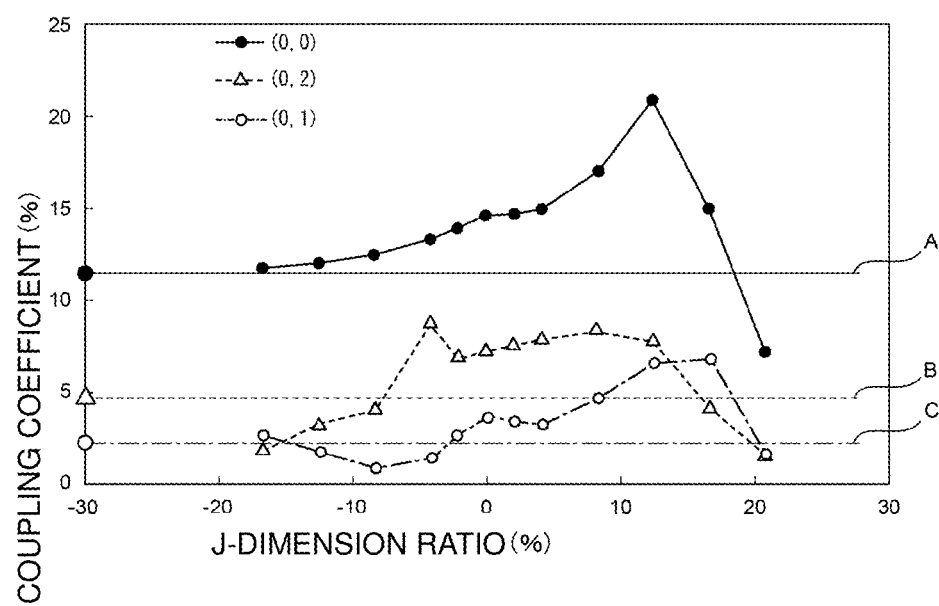
FIG. 15 is a graph illustrating a relationship between a J-dimension ratio and an electromechanical coupling coefficient.

FIG. 15 is a graph illustrating a relationship between the J-dimension ratio and an electromechanical coupling coefficient in the (0, 0) mode, the (0, 1) mode, or the (0, 2) mode. The electromechanical coupling coefficient indicates an efficiency of conversion of an electrical input into a mechanical output. The electromechanical coupling coefficient is calculated with respect to a bandwidth when the vibrating device is assumed as a resonator. If the electromechanical coupling coefficient is small, the amplitude attenuates sharply when the frequency deviates only slightly from a peak amplitude frequency even if the amount of peak amplitude is the same. This makes it difficult to maintain the amplitude. In FIG. 15, lines denoted by A, B, and C indicate the electromechanical coupling coefficients for the (0, 0) mode, the (0, 1) mode, and the (0, 2) mode, respectively, when the outside diameter of the second connection portion is D. In other words, a case of the electromechanical coupling coefficient becoming lower than the line A, B, or C means that it is not necessary to provide the second connection portion. In order to obtain the effect of providing the structure of the S-shaped cross section, the J-dimension ratio is set such that the corresponding coupling coefficient becomes higher than the line A, B, or C.

Accordingly, in the (0, 0) mode, the J-dimension ratio is preferably in a range of about −16% or more and about +19% or less, for example. In the (0, 2) mode, the J-dimension ratio is preferably in a range of about −8% or more and about +16% or less, for example. In the (0, 1) mode, the J-dimension ratio is preferably in a range of about −3% or more and about +20% or less, for example.

In the case of the vibrating device 2 that utilizes these three modes, it is more preferable that the J-dimension ratio is about +16% or less, and at the same time, the J-dimension ratio is about −3% or more, for example.

Figure 16:
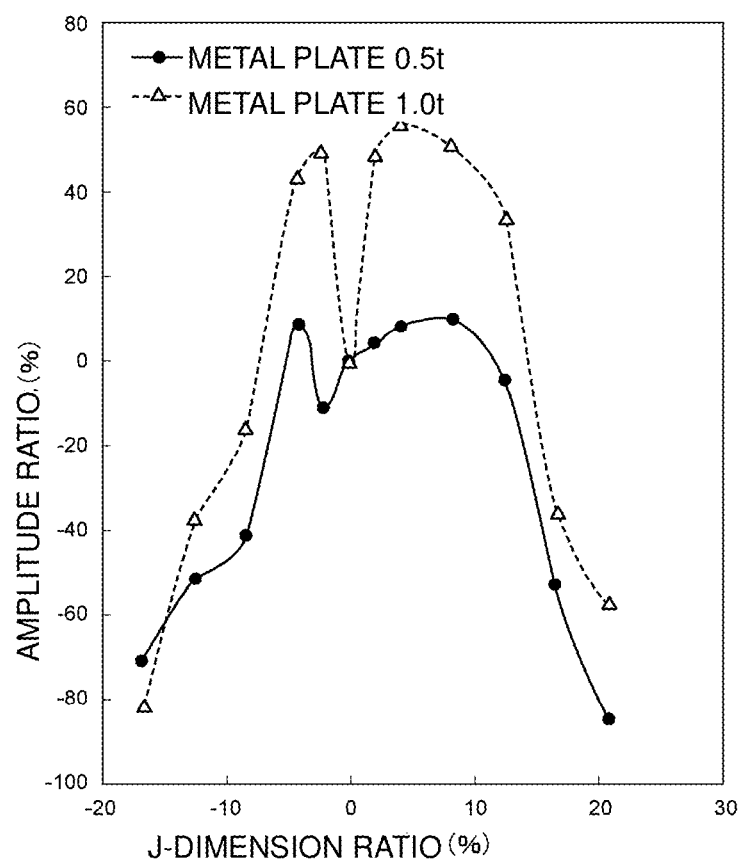
FIG. 16 is a graph illustrating a relationship between the J-dimension ratio and an amplitude ratio when the (0, 2) mode is used.

FIG. 16 is a graph illustrating a relationship between the J-dimension ratio and an amplitude ratio (%) when the (0, 2) mode of vibration is used. Here, the amplitude ratio (%) is a percentage (%) of increase or decrease of amplitude with respect to the amplitude when J=D.

In FIG. 16, the solid line represents results when the second ring-shaped portion 18 is a metal plate having a thickness of about 0.5 t, whereas the dotted line represents results for the metal plate having a thickness of about 1.0 t. Note that t=about 1.0 mm.

As shown in FIG. 16, in either of the two thickness cases of the second ring-shaped portion 18, a large amplitude can be obtained in the case of the J-dimension ratio falling, for example, in the range of about −6% or more and about −4% or less on the "−" side and in the range of about −0% or more and about 12% or less on the "+" side.

Figure 17:
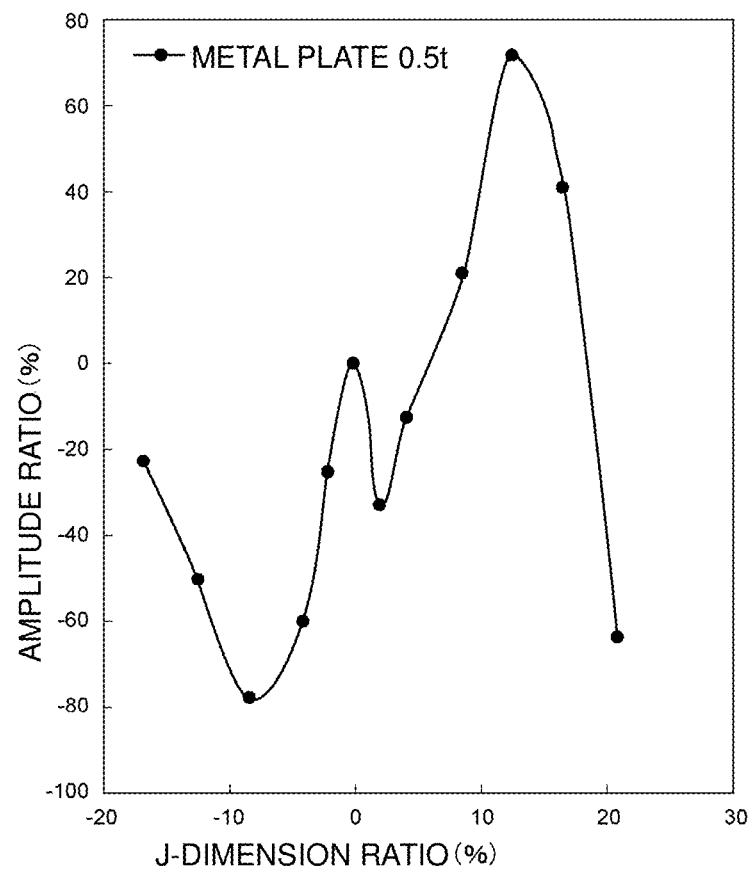
FIG. 17 is a graph illustrating a relationship between the J-dimension ratio and the amplitude ratio when the (0, 1) mode is used.

FIG. 17 is a graph illustrating a relationship between the J-dimension ratio and the amplitude ratio (%) when the (0, 1) mode of vibration is used. Here, the thickness of the metal plate defining and functioning as the second ring-shaped portion 18 was about 0.5 t.

In the case of the (0, 1) mode, as shown in FIG. 17, it is preferable that the j-dimension ratio is in the vicinity of about 0% or in the range of about 5% or more and about 15% or less, for example. It is shown that a larger amplitude can thus be obtained.

Figure 18:
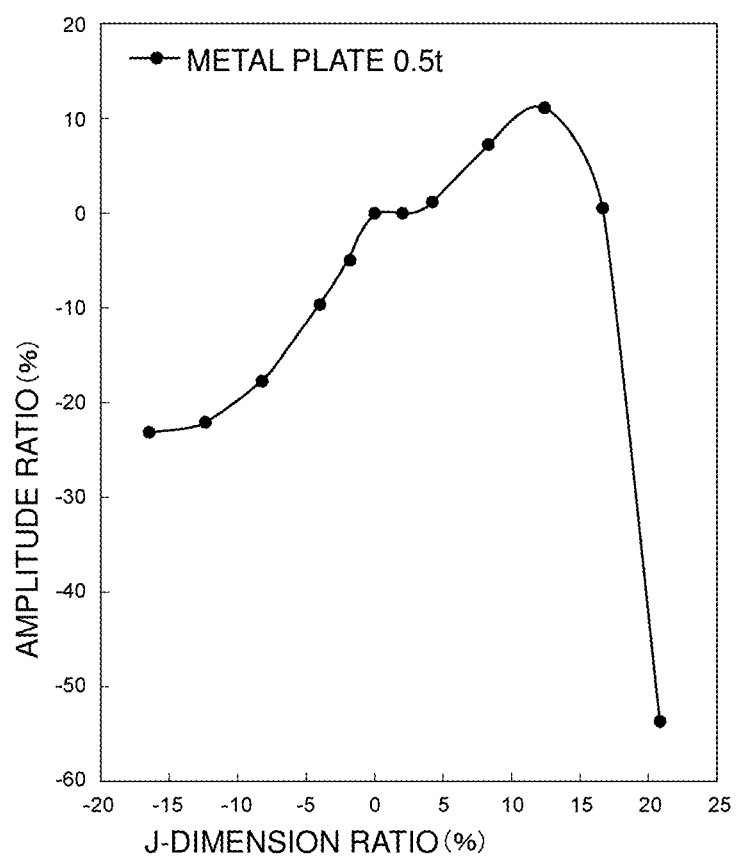
FIG. 18 is a graph illustrating a relationship between the J-dimension ratio and the amplitude ratio when the (0, 0) mode is used.

FIG. 18 is a graph illustrating a relationship between the J-dimension ratio and the amplitude ratio (%) when the (0, 0) mode of vibration is used.

As shown in FIG. 18, it is preferable that the j-dimension ratio is, for example, in the range of about 0% or more and about 12% or less in the case of the (0, 0) mode. It is shown that a larger amplitude can be obtained in such a case.

In preferred embodiments of the present invention, it is preferable that the vibrating portion defined by the dome-shaped cover is vibrated in the (0, 0) mode, the (0, 1) mode, and the (0, 2) mode. In such a case, as shown in FIGS. 15 to 18, the J-dimension ratio preferably stays, for example, in the range of about 5% or more and about 12% or less for any one of the modes. This enables liquid droplets, such as water droplets, remaining on the outside surface of the cover 11 to move a large amount and to be atomized and thus removed.

However, if any one of the (0, 0) mode, the (0, 1) mode, and the (0, 2) mode is used or if any two of these are used, it is sufficient to use a corresponding preferable range of the J-dimension ratio shown in FIGS. 16 to 18.

The J-dimension ratio is preferably in the range of about 5% or more and about 15% or less, for example. However, the cover 11 can be vibrated in the (0, 0) mode, the (0, 1) mode, or the (0, 2) mode as described above, provided that the outside diameter of the second ring-shaped portion 18 is different from the outside diameter of the cylinder portion 14. It is preferable that the second ring-shaped portion 18 is provided such that the outside diameter is slightly different from the outside diameter of the cylinder portion 14, which can stabilize the electromechanical coupling coefficient.

In the above-described preferred embodiment, the imaging element is used as an optical detector element, and the field of view is a detection field. However, the optical detector element may be an element that optically detects activation energy. In this case, at least one of infrared beams and electromagnetic waves can preferably be used as the activation energy beams.

An optical detector device according to a preferred embodiment of the present invention includes a vibrating device according to a preferred embodiment of the present invention and the optical detector element. The optical detector element is disposed in at least a portion of internal space of cylindrically formed vibrating body of the vibrating device. The optical detector element has the detection field in the cover. Accordingly, the optical detector device according to preferred embodiments of the present invention are not limited to a camera. For example, the present invention may be applied to an on-board radar device known as "RADAR" or "LiDAR".

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibrating device comprising:
   a dome-shaped cover disposed so as to include a detection field of an optical detector element;
   a cylindrical or substantially cylindrical vibrating body to which the cover is fixed; and
   a piezoelectric element fixed to the vibrating body and vibrating the cover via the vibrating body; wherein
   the vibrating body includes:
      a cylinder portion including a first end portion positioned near the cover and a second end portion positioned opposite to the cover;
      a cylindrical or substantially cylindrical first connection portion connected to the first end portion of the cylinder portion and having an inside diameter larger than an inside diameter of the cylinder portion;
      a first ring-shaped portion connected to the first connection portion at a position near the cover and having an inside diameter smaller than the inside diameter of the first connection portion, the cover being connected to a surface of the first ring-shaped portion proximate to the cover;
      a second connection portion connected to the second end portion of the cylinder portion and having an outside diameter smaller than an outside diameter of the cylinder portion; and
      a second ring-shaped portion fixed to a surface of the second connection portion opposite to a surface to which the cylinder portion is connected and having an outside diameter larger than the outside diameter of the second connection portion; and
   the piezoelectric element is fixed to a surface of the second ring-shaped portion opposite to the surface fixed to the second connection portion.

2. The vibrating device according to claim 1, wherein the second end portion of the cylinder portion is positioned within a range of about ½±40% of a dimension of the cylindrical or substantially cylindrical vibrating body in a direction extending between the first end portion of the cylinder portion and the second end portion thereof.

3. The vibrating device according to claim 1, wherein the outside diameter of the second ring-shaped portion is different from the outside diameter of the cylinder portion.

4. The vibrating device according to claim 1, wherein a difference obtained from a formula of the outside diameter of the second ring-shaped portion—the outside diameter of the cylinder portion is about +16% or less of the outside diameter of the cylinder portion.

5. The vibrating device according to claim 1, wherein a vibrating portion including the vibrating body and the cover vibrates in a (0, 0) mode.

6. The vibrating device according to claim 5, wherein a difference obtained from a formula of the outside diameter of the second ring-shaped portion—the outside diameter of the cylinder portion is about 0% or more and about 15% or less of the outside diameter of the cylinder portion.

7. The vibrating body according to claim 1, wherein a vibrating portion including the vibrating body and the cover vibrates in a (0, 1) mode.

8. The vibrating device according to claim 7, wherein a difference obtained from a formula of the outside diameter of the second ring-shaped portion—the outside diameter of the cylinder portion is in a vicinity of about 0% of the outside diameter of the cylinder portion or in a range of about 5% or more and about +15% or less of the outside diameter thereof.

9. The vibrating body according to claim 1, wherein a vibrating portion including the vibrating body and the cover vibrates in a (0, 2) mode.

10. The vibrating device according to claim 9, wherein a difference obtained from a formula of the outside diameter of the second ring-shaped portion—the outside diameter of the cylinder portion is in a range of about −6% or more and about −4% or less of the outside diameter of the cylinder portion or in a range of about 0% or more and about +12% or less of the outside diameter thereof.

11. The vibrating device according to claim 1, wherein the outside diameter of the cylinder portion is equal or substantially equal to an outside diameter of the first connection portion.

12. The vibrating device according to claim 1, wherein the second ring-shaped portion is a vibrating plate.

13. The vibrating device according to claim 12, wherein the second ring-shaped portion is a flange that protrudes radially outward from an outer circumferential edge of the second connection portion.

14. The vibrating device according to claim 1, wherein the piezoelectric element has a ring shape, and an outside diameter of the piezoelectric element is equal or substantially equal to the outside diameter of the cylinder portion.

15. The vibrating device according to claim 1, wherein the cover includes a light-transmissive portion.

16. An optical detector device comprising:
   the vibrating device according to claim 1; and
   an optical detector element disposed in at least a portion of an internal space of the cylindrical or substantially cylindrical vibrating body of the vibrating device and including a detection field in the cover.

17. The optical detector device according to claim 16, wherein the optical detector element is an imaging element, and the detection field is a field of view.

18. The optical detector device according to claim 16, wherein the optical detector element is an element that optically detects activation energy beams.

19. The optical detector device according to claim 18, wherein the activation energy beams are at least one of infrared beams and electromagnetic waves.

\* \* \* \* \*